United States Patent [19]

Okinaga

[11] Patent Number: 4,854,788

[45] Date of Patent: Aug. 8, 1989

[54] DRILL

[75] Inventor: Hiroaki Okinaga, Tokyo, Japan

[73] Assignees: Nikken Tool Co., Ltd.; Yoshino Seiki Inc., both of Japan

[21] Appl. No.: 90,666

[22] Filed: Aug. 28, 1987

[51] Int. Cl.[4] ........................ B23B 51/04; B23B 51/06

[52] U.S. Cl. ...................................... 408/59; 175/329; 175/404; 279/99; 408/57; 408/144; 408/145; 408/204; 408/226

[58] Field of Search ....................... 279/99; 408/56, 57, 408/59, 144, 145, 204–206, 226, 239 R; 125/20; 175/330, 403, 329, 404

[56] References Cited

U.S. PATENT DOCUMENTS

| | | | |
|---|---|---|---|
| 1,156,336 | 10/1915 | Wegland | 279/99 |
| 1,979,325 | 11/1934 | Goldberg | 279/99 |
| 2,264,440 | 12/1941 | Havlick | 175/329 |
| 2,558,415 | 6/1951 | Bonsall | 175/329 |
| 2,731,236 | 1/1956 | Bruce | 175/404 X |
| 2,870,993 | 1/1959 | Jahnke | 255/47 |
| 2,998,088 | 8/1961 | Pennington, II | 175/329 |
| 3,318,400 | 5/1967 | Hildebrandt | 175/329 |
| 3,421,392 | 1/1969 | Bangerter et al. | 408/57 |
| 3,833,077 | 9/1974 | Lavallee | 175/329 X |
| 3,884,120 | 5/1975 | Diferdinando | 408/239 R X |

FOREIGN PATENT DOCUMENTS

| | | | |
|---|---|---|---|
| 2436023 | 2/1976 | Fed. Rep. of Germany | 408/241 G |
| 60-87650 | 6/1985 | Japan . | |
| 61-146412 | 7/1986 | Japan . | |
| 898004 | 6/1962 | United Kingdom | 175/329 |

OTHER PUBLICATIONS

*Tool and Manufacturing Engineers Handbook*, 4th Ed., vol. 1, Drozda et al, eds. (Society of Manufacturing Engineers; Dearborn, MI, 1983), pp. 9–27.

*Primary Examiner*—Steven C. Bishop
*Attorney, Agent, or Firm*—Wenderoth, Lind & Ponack

[57] ABSTRACT

A drill comprising a drill shank having a taper portion adjacent to a threaded portion provided on the rear or basal portion of the shank. When the drill is screwed into an axial hole in a drill holder of a drilling machine, the opening edge or inner tapered wall of the axial hole of the drill holder bites into the taper portion of the drill shank, consequently to bring the drill into firm connection with the drill holder of the drilling machine.

2 Claims, 5 Drawing Sheets

DRILL

BACKGROUND OF THE INVENTION

1. Field of the Invention

This invention relates to a drill for boring holes in a rigid workpiece of a stone, concrete, metal, etc. More particularly, this invention relates to a high-speed rotary drill provided along its axis with a fluid passage through which a fluid such as air is supplied so as to blow away chips generated in drilling the rigid material.

2. Description of the Prior Art

As a typical drill for drilling rigid materials of a stone, concrete, metal or the like, there has been known an impact twist drill having a cutting bit with a striking edge. With this twist drill, drilling work to bore a hole into the rigid material is carried out by rotating the drill at about 700 to 1000 rpm under pressure and simultaneously imparting vibrations in the axial direction to the drill. Because the conventional drill of this type is subjected to rotation and vibration in the axial direction, the rotational speed of the drill could not be increased, and consequently, the efficiency of drilling could not be improved. Besides, vibrations and noises generated in drilling cause an environmental nuisance and exert a harmful influence upon not only the drilling machine but also the material to be drilled.

The inventor of the present invention has proposed drills capable of nonshock, high-speed drilling in Japanese Utility Model Application Public Disclosure SHO No. 60(1985)-87650(A) and Japanese Patent Application Public Disclousure SHO No. 61(1986)-146412(A). Every drill proposed by the inventor is provided on its leading end with a cylindrical cutting bit which is formed by sintering ultra-hard abrasive grains including diamond grains and can fully withstand the drilling work carried out at high speed. Furthermore, the proposed drill has a fluid passage formed along the axis thereof so as to introduce a fluid such as air therethrough and spout it from the cutting bit disposed at the leading end of the drill, thereby to effectively remove cutting chips generated in drilling.

However, though the prior art drill makes it possible to fulfill the effective drilling work at high speed, another problem in relationship between the drill and the drilling machine arises. This will be explained as follows.

In order to facilitate attachment and detachment of the drill and the drill holder of the drilling machine and attain compactness of the drilling system consisting of the drill and the drilling machine, the drilling system adopts a screwed type coupling structure constituted by a male thread formed on the drill and a female thread formed inside the drill holder. However, compared with a conventional twist drill which rotates at relatively low speed of less than 1000 rpm to drill a given object, the aforementioned high-speed drill has to be strongly coupled with the drill holder of the drilling machine. Generally, the screwed type coupling structure in the drilling system as mentioned above has a fine clearance between the male thread of the drill and the female thread of the drill holder of the drilling machine in order to perform the attachment and detachment operations of the drill and the drill holder with ease, whereas the clearance causes wobbling of the drill which rotates at high speed.

Another reason why the coupling strength between the drill and the drill holder of the high-speed drilling machine should be improved is that the drill in drilling the rigid material at high speed suffers enormous torque.

Also, the drilling system of this type which is applied for drilling the rigid material has called for a chip exhausting function of effectively removing cutting chips produced in drilling.

SUMMARY OF THE INVENTION

In view of the above, one object of the invention is to provide a drill capable of being firmly retained by the drill holder of a drilling machine and maintaining stable high-speed rotation without wobbling, thereby to effectively bore a hole in a rigid material.

Another object of the invention is to provide a drill having a structure capable of effectively removing cutting chips produced in drilling and cooling a cutting bit disposed at the leading end of the drill.

To attain the above objects, a drill according to this invention comprises a hollow drill shank having a fluid passage, a cylindrical cutting bit disposed at the leading end of the drill shank, a fitting portion formed on the rear or basal part of the drill shank and composed of a threaded portion which is fitted into the drill holder of a drilling machine and a taper portion disposed adjacent to the threaded portion, which taper portion has a diameter gradually increased toward the leading end of the shank.

The screw thread of the threaded portion of the drill is designed so as to be tightened up by turning the drill in the inverse direction of the rotation of the drill driven by the drilling machine, namely, it is a reversing screw. When the threaded portion of the drill is screwed in an axial hole formed in the drill holder of the drilling machine, an opening edge of the axial hole of the drill holder comes into contact with the taper portion of the drill so as to be permitted to elastically press against the taper portion of the drill. The taper portion acts as a wedge relative to the drill holder, thereby to bring the drill into fast connection with the drill holder of the drilling machine.

By utilization of a drill holder having a cone-shaped axial hole for accommodating the fitting portion of the drill, which is formed in conformity with the outer surface of the taper portion of the drill, the stability of coupling of the drill with the drill holder of the drilling machine is further elevated. In this case, the wedge effect of the taper portion of the drill which acts on the drill holder is far improved by a reaction produced in drilling, thereby to permit the drill and the drill holder to be in intimate contact with each other.

The above and other objects, features and advantages of the present invention will become more apparent from the following detailed description taken with the accompanying drawings.

BRIEF DESCRIPTION OF THE DRAWINGS

FIGS. 10(A), 10(B), 11(A), 11(B), 12(A), and 12(B) respectively illustrate other embodiments of this invention.

DESCRIPTION OF THE PREFERRED EMBODIMENTS

Figure 1:
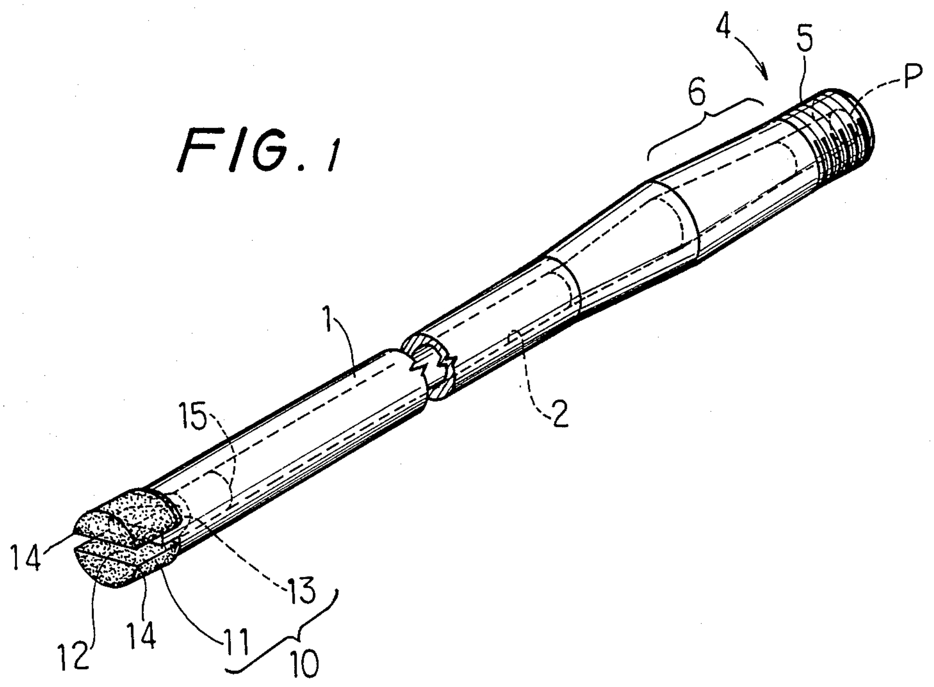
FIG. 1 is a perspective view of one preferred embodiment of the drill according to this invention.

One preferred embodiment of the drill according to the present invention will now be described with reference to FIGS. 1 and 2.

The drill of the invention comprises a hollow drill shank 1 having a fluid passage 2 formed along the axis of the shank, a cylindrical cutting bit 10 provided at the leading end of the drill shank 1, and a fitting portion 4 which is formed on the rear or basal part of the drill shank 1 so as to be coupled to a drill holder H of a drilling machine or electric hand drill A. The fitting portion 4 of the shank 1 is composed of a threaded portion 5 formed on the rear portion of the shank 1 and a taper portion 6 disposed adjacent to the threaded portion 5. The threaded portion 5 has a male thread which is fitted into an axial hole h in the drill holder H having a female thread f. The thread of the threaded portion 5 is a reversing screw relative to the direction of rotation of the drill holder H of the drilling machine. That is to say, the male thread of the drill shank 1 and the female thread of the drill holder H are so designed that the threaded portion 5 of the drill shank 1 in the state being fitted in the axial hole h of the drill holder is tightened up by turning the drill holder H in the reverse direction of rotating the drill with the drilling machine.

The minimum diameter on the rear side of the taper portion 6 is substantially equal to the minor diameter of the male thread on the threaded portion 5 and the outer diameter of the taper portion 6 is gradually increased toward the middle portion of the drill shank 1. Therefore, when the threaded portion 5 is driven into the axial hole h of the drill holder by turning the drill shank 1 relative to the drill holder H, the opening edge e of the axial hole h comes into contact with the taper portion 6. When the threaded portion 5 of the drill shank is further turned to advance inside the axial hole h of the drill holder, the opening edge e of the axial hole h bites or presses elastically into taper portion 6, thereby to bring the drill shank 1 into firm engagement with the drill holder H. Furthermore, the drill which is rotated by the drilling machine acquires a reaction caused in drilling a rigid material. The reaction thus caused acts as torque in the reverse direction of rotating the drill, thereby to cause the male thread of the drill to be driven still deeper into the axial hole h of the drill holder H of the drilling machine. As a result, the drill and the drill holder are strongly and stably coupled with each other.

Figure 2:
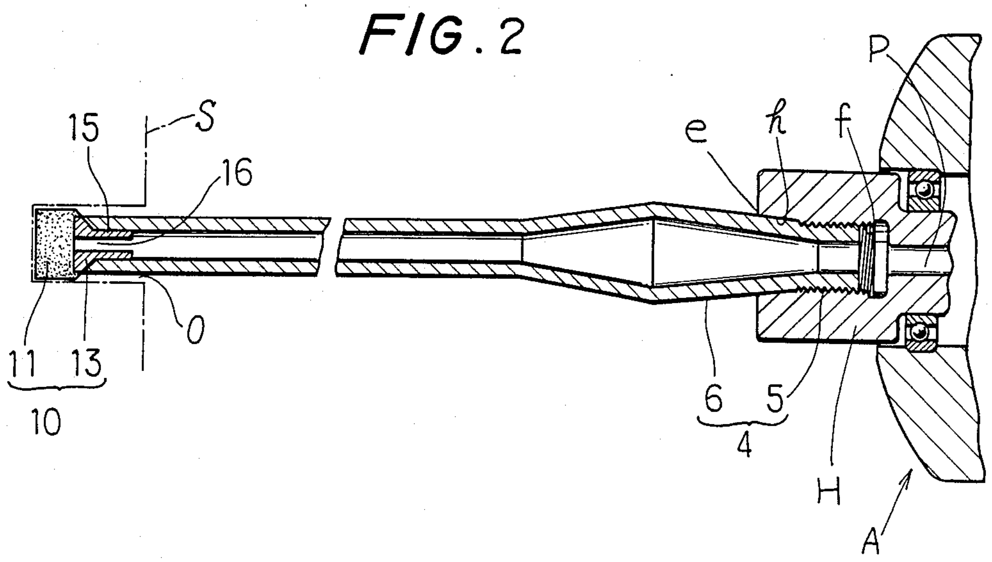
FIG. 2 is a sectional side view illustrating the drill of FIG. 1.
Figure 3:
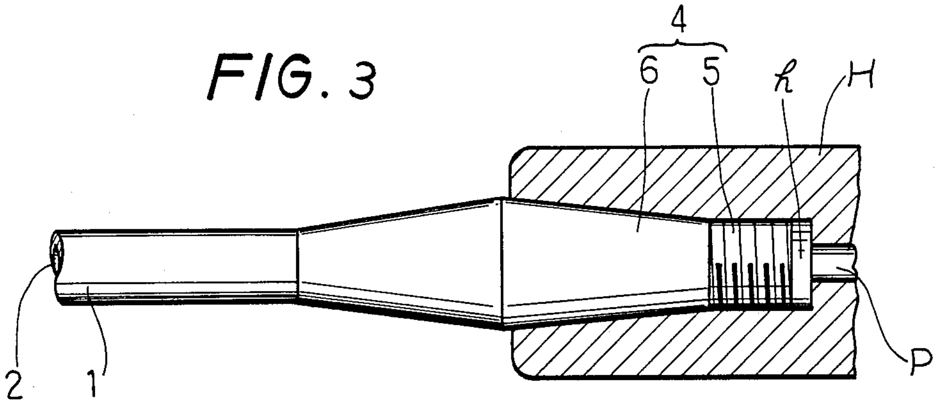
FIG. 3 is an enlarged side view of the fitting portion of the drill according to this invention.

In the illustrated embodiment in FIGS. 1 and 2, the opening edge e of the drill holder H comes in circumferential line contact with the taper portion 6 of the drill. If the coupling strength of the drill and the drill holder which are in line contact with each other is insufficient, a drill holder having an axial hole h defined by a female thread and a conical inner wall as illustrated in FIG. 3 may be used. The conical inner wall located between the opening edge of the axial hole h and the female thread is formed in conformity with the taper portion 6 of the drill so as to extend substantially the full length thereof. With this structure, the taper portion 6 of the drill comes into surface contact with the conical inner wall of the axial hole h of the drill holder H, consequently to enable the coupling strength of the drill and the drill holder to be improved remarkably.

In either embodiment, a feed port p from which the fluid such as air is introduced into the fluid passage 2 formed along the axis of the drill shank 1 is formed in the basal portion of the drill holder H and connected to a hollow rotary shaft of a driving motor (not shown) contained within the drilling machine A. Thus, the fluid introduced into the fluid passage 2 of the drill shank 1 through the feed port p is ejected from the cutting bit 10 at the leading end of the drill shank 1.

Figure 4:
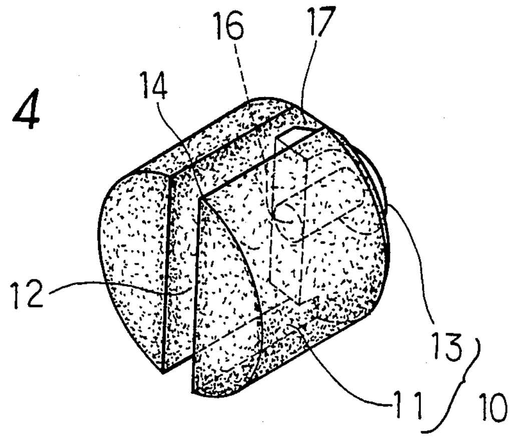
FIG. 4 is an enlarged perspective view illustrating the cutting bit of the drill according to this invention.

The cutting bit 10 disposed at the leading end of the shank 1 is formed by shaping ultra-hard abrasive grains including, for example, diamond grains into a cylinder and sintering it. The cylindrical cutting bit 10 in this embodiment is composed of two halves of cutting portions 11 which are separated by a longitudinal slit 12 which forms an axially extending groove in the outer periphery of the cutting bit. Accordingly, the cutting bit 10 has cutting blades formed at the intersecting edges between the inner walls defining the slit 12 and the circumferential surfaces of the cutting portions 11. The outer diameter of the cutting bit 10 is larger than that of the drill shank 1. Also, the cutting bit 10 has a connecting portion 13 for connecting the cutting portions 11 to the drill shank 1 as shown in FIG. 4.

In this embodiment, the connecting portion 13 attached to the cutting bit 10 has a conical configuration. In conformity with this configuration of the connecting portion 13, the inner wall at the leading end portion of the drill shank 1 is shaped substantially in a cone. Thus, by forming both the outer surface of the connecting portion 13 and the inner surface of the leading end portion of the shank 1 in the shape of a cone, the contact area between the connecting portion 13 and the leading end portion of the shank 1 becomes large, thereby to increase the coupling strength therebetween and readily perform centering therebetween in assembling. In order to easily attach the cutting bit 10 to the drill shank 1 and facilitate the centering between the connecting portion 13 and the shank 1 in assembling, the connecting portion 13 may be provided with a sleeve 15 extending from the apex of the cone-shaped connecting portion 13 in the axial direction of the cutting bit as illustrated in FIG. 2. The connecting portion 13 has a through hole 16 formed along the axis thereof and opening into the slit 12. The through hole 16 is smaller in diameter than the fluid passage 2 of the drill shank 1 to act as an orifice. Therefore, the flowing speed of the fluid which is introduced into and flows through the fluid passage 2 in the shank 1 increases at the through hole 16 in the connecting portion 13. The outer diameter of the connecting portion 13 is substantially equal to the inner diameter of the fluid passage 2, whereas the outer diameter of the cutting bit 10 is larger than that of the drill shank 1. Therefore, when the cutting bit 10 in rotation bores down a hole in a given workpiece, the slit 12 formed in the cutting bit 10 opens into a circumferential space around the drill shank 1 in the hole through gaps outside portions 17 of the connecting portion 13 located within the slit 12 and spaced inwardly of the outer periphery of the cutting bit 10. With the drill having the aforementioned structure, when a given rigid material S is drilled to form a hole O as illustrated by the imaginary line in FIG. 2, the fluid introduced into the fluid passage 2 in the shank 1 and ejected from the through hole 16 in the connecting portion 13 passes through the slit 12 and the space around the drill shank 1 and escapes outward from the hole O. At this time, cutting chips produced in drilling are blown off and effectively removed from the bored hole O.

Figure 5:
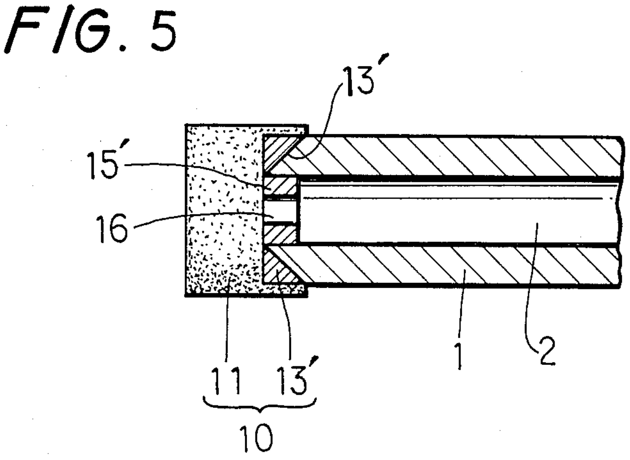
FIG. 5 is a sectional side view illustrating the cutting bit in another embodiment of this invention.

In the embodiment described above, the connecting portion 13 is shaped in a male cone and the leading end portion of the shank 1 is shaped in a female cone. Conversely, as illustrated in FIG. 5, the connecting portion 13′ may be shaped in a female cone and the leading end portion of the shank 1 may be shaped in a male counterpart. In this case, the connecting portion 13′ is provided with a sleeve 15′ to be inserted into the fluid passage 2 in the drill shank 1, which extends from the innermost portion of the conical female surface of the connecting portion 13. In this embodiment, the elements indicated by like reference numerals with respect to those of the first embodiment have analogus structures and functions to those of the first embodiment and will not be described in detail again.

Still another embodiment illustrated in FIGS. 6 and 7 will be described, in which the fitting portion of the shank and the cutting bit are somewhat modified. Also, in this embodiment, the elements denoted by the same reference numerals and symbols as those in the foregoing embodiments are equivalent in structure and function to those in the foregoing embodiments and will not be explained again here.

The cutting bit 20 in this embodiment is butt-joined to the leading end of the shank 1 and composed of a cylindrical cutting portion 21 having a through hole 22 deviated from the axial center of the cutting portion 21. The cutting portion 21 is provided in its front surface 23 on the leading end thereof with a front groove 24 extending radially and passing through the opening of the through hole 22 and the axial center of the cutting portion 21 and in its circumferential surface with side grooves 25*a*, 25*b* connected with the aforesaid front groove 24. Though these grooves 24, 25*a*, 25*b* have an arc-shaped cross-section, they may of course be rectangular in cross-section. In any case, these grooves may be designed so as to form cutting blades at the intersectional edge portions between the front or side surface and the walls defining the grooves.

In the case of drilling a rigid material by use of the drill in which the through hole for spouting the blowing fluid is formed along the axial center of the cutting bit, there is a possibility that the central part of the portion to be cut by the drill of the workpiece is not cut out and is left like a column. However, the drill in the embodiment shown in FIGS. 6 and 7, in which the through hole 22 in the cutting bit 20 is eccentrically displaced and the front groove 24 is formed in the front surface, is free from such a disadvantage as touched on above. Still more, owing to the side grooves 25*a*, 25*b* formed in the circumferential surface of the cutting bit, the cutting efficiency can be increased remarkably, and further, the fluid ejected from the through hole 22 is effectively discharged via the side grooves 25*a*, 25*b* together with the cutting chips produced in drilling.

Figure 8A:
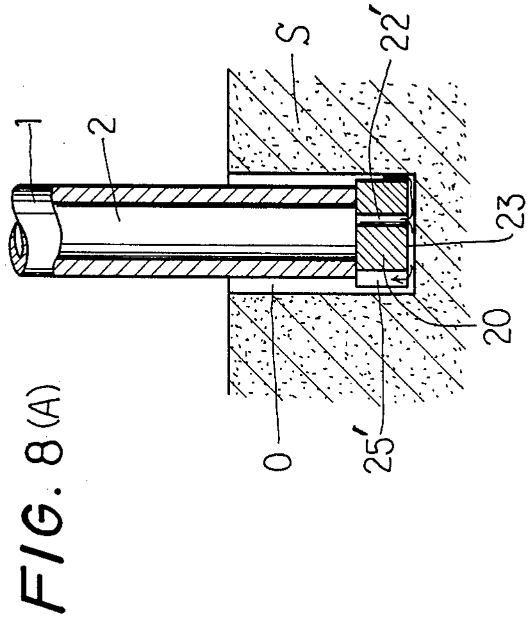
FIGS. 8(A) and 8(B) are a sectional side view and a perspective view illustrating the cutting bit of yet another embodiment, respectively.
Figure 8B:
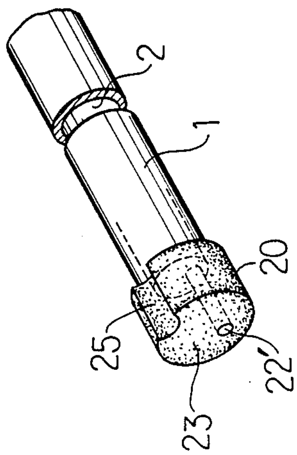

A relatively large quantity of fluid ejected from the through hole 22 is apt to flow through the side groove 25*a* positioned nearer to the through hole 22 relative to the side groove 25*b*, because the route from the through hole 22 to the side groove 25*a* involves less flowing resistance than that of the route from the through hole 22 to the side groove 25*b*. If one is concerned about this from the viewpoint of effects of removing cutting chips and cooling the cutting bit, the cutting bit 20 may, as illustrated in FIGS. 8(A) and 8(B), be formed with a single groove 25′ in the circumferential side surface at the farthest position from the opening of the through hole 22′. The cutting bit 20 in this embodiment has no front groove. With this cutting bit, the fluid ejected from the through hole 22 takes both the shortest route to the circumferential side surface and the longest route extending to the side groove 25′. That is, the fluid ejected from the through hole 22 in the cutting bit in rotation is dispersed substantially uniformly in all directions.

If the through hole 22′ and the side groove 25′ are suitably designed in size or diameter and position, the inertia mass of the cutting bit in rotation can be well balanced, thereby to suppress occurrence of wobbling. Thus, the cutting chips and heat generated in drilling can be effectively removed by the fluid ejected from the through hole 22′.

Figure 9:
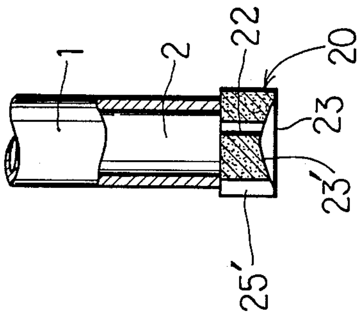
FIG. 9 is a sectional side view illustrating the cutting bit of further embodiment.

FIG. 9 shows another cutting bit 20 which is provided in its front surface with a spherical or conical concavity 23′. With this structure of the cutting bit, the stability of rotation of the drill is somewhat improved. The other elements in this embodiment are the same as those shown in FIGS. 8(A) and 8(B).

Figures 10, 11, 12, 13:
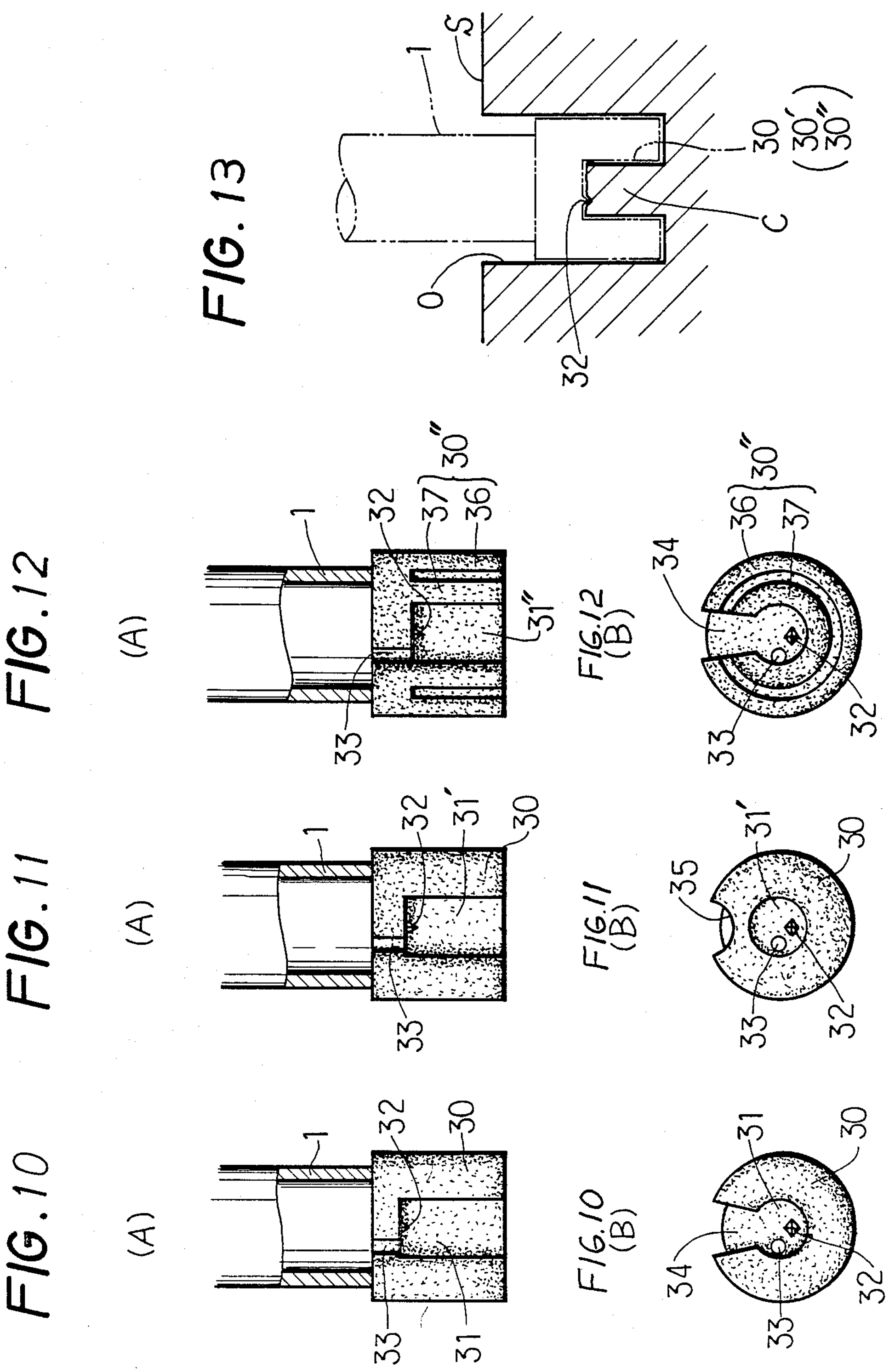
FIG. 13 is a sectional side view illustrating the hole bored in a material to be drilled by use of the drill shown in FIGS. 10, 11 or 12.

FIGS. 10 to 12 are other preferred embodiments of the cutting bit of the drill according to this invention.

Because the rotational speed at the center of the leading end surface of the cutting bit in drilling is zero, no cutting is theoretically effected at the center of the cutting bit. In fact, the center portion of the leading end surface of the cutting bit can however scrape the workpiece to be drilled due to minute vibrations of the cutting bit occurring in the radial direction. But, the cutting efficiency at that portion is inferior.

In order to improve the cutting efficiency at the center portion of the leading end surface of the cutting bit, the cutting bit 30 (30′, 30″) is provided with a blind cavity 31 (31′, 31″) and a relatively large diamond chip 32 on the innermost wall in the blind cavity 31 (31′, 31″), as illustrated in FIG. 10 (FIGS. 11 and 12). The diamond chip 32 is disposed as displaced slightly from the center of the cutting bit. It is preferable to position one of the corners of the diamond chip at the center of the cutting bit so as not to leave the center portion of the workpiece to be drilled.

The cutting bit 30 illustrated in FIG. 10 has a radially extending opening slit 34 through the circumferential wall defining the blind cavity 31, through which the fluid introduced into the fluid passage 2 and ejected from a through hole 33 is discharged.

The cutting bit 30′ in FIG. 11 is provided in the outer circumferential surface thereof with a longitudinal side groove 35 similarly to the embodiment illustrated in FIG. 8. With this structure, the fluid ejected from the through hole 33 can be discharged effectively and smoothly.

In the cutting bit 30″ of FIG. 12, the circumferential wall having an opening slit 34 like that in FIG. 10 is composed of an outer semi-annular grinding member 36 and an inner semi-annular grinding member 37 which are coaxially arranged. The outer grinding member 36 which rotates at relatively high speed is made of relatively small abrasive grains, and the inner grinding member 37 which rotates at relatively low speed is made of relatively large abrasive grains. With this structure having the coaxial grinding members different in grain size and the diamond chip 32 disposed on the innermost wall of the blind cavity, the cutting efficiency is remarkably increased. Though the outer grinding member 36 and the inner grinding member 37 in the illustrated embodiment are disposed as separated by a gap as a matter of manufacturing design, they may of course be formed in one piece.

The elements denoted by the same reference numerals in the embodiments shown in FIGS. 10 to 12 are equivalent to one another. According to these drills, as illustrated in FIG. 13, the hole O can be bored in the material S by means of the cutting bit 30 (30′, 30″) while cutting the center portion in the hole by means of the diamond chip 32.

Figure 6:
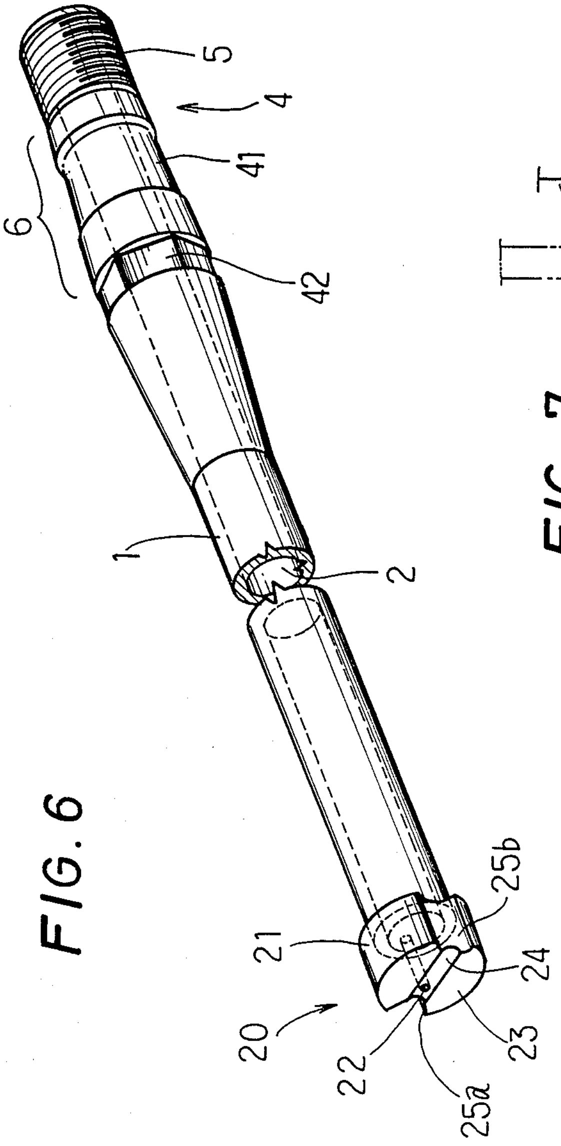
FIG. 6 is a perspective view illustrating still another embodiment of this invention.
Figure 7:
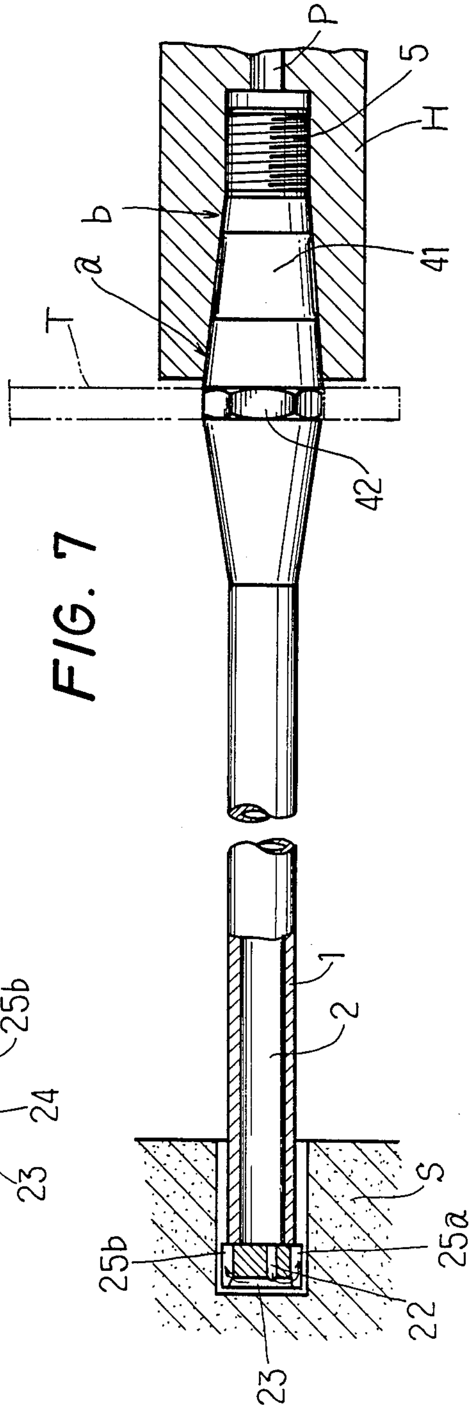
FIG. 7 is a side view, partly in section, of the drill of FIG. 6.

Turning to FIGS. 6 and 7, other modifications in the drill according to the invention will now be explained.

The taper portion 6 of the drill shank 1 has a constricted or relief portion 41 which forms a gap between the surfaces of the taper portion 6 and the tapered inner wall defining the axial hole of the drill holder H in such a state that the fitting portion 6 of the drill is closely fitted into the axial hole of the drill holder H. Due to the provision of the constricted portion 41 in the taper portion 6 of the drill, if a little extraneous substance such as a cutting chip enters into the axial hole of the drill holder H before the drill is coupled into the drill holder, the coupling between the drill and the drill holder is not hardly affected by the extraneous substance. Thus, incomplete coupling which involves wobbling of the drill can be prevented. As is apparent from the purpose of providing the constricted portion 41, the constricted portion may be formed so that the taper portion 6 comes into contact with the inner surface of the axial hole h of the drill holder H at two longitudinally spaced apart circumferential positions a, b.

Moreover, in the embodiment, the drill shank 1 is provided with a hold portion 42 formed in a polygonal shape (hexagon in the illustrated embodiment) for receiving a tool T such a spanner. When the drill is attached to or detached from the drill holder H of the drilling machine, the tool T is fitted to the hold portion 42 to easily rotate the drill relative to the drill holder.

As is readily understood from the above, the drill according to the present invention can be firmly coupled to the drill holder of the drilling machine by providing the threaded portion 5 and the taper portion 6 on the drill shank 1, since the opening edge or the tapered inner wall of the axial hole h in the drill holder H bites elastically into the taper portion 6 by screwing the drill in the axial hole of the drill holder. When the drill is driven to bore a hole in a rigid workpiece such as a concrete material, the coupling strength is further increased due to a reaction caused by rotating the drill having the reversing screw of the threaded portion 5 relative to the direction of rotation of the drill holder of the drilling machine. Therefore, the drill is stably rotated without wobbling even at ultra-high speed above 1000 rpm.

The thickness of the shank wall defining the fluid passage 2 within the drill shank 1 should be made uniform at least in its circumferential direction over the whole length thereof in order to well balance the inertia mass of the drill in rotation. Accordingly, one of methods for producing the drill having such uniform wall thickness comprises preparing a solid rod having a bulged portion forming the taper portion 6 and precisely boring a straight through hole in the solid rod along the axial center of the rod. By this method, the drill as illustrated in FIG. 6 can be obtained. Otherwise, the drill as illustrated in FIG. 1 may be manufactured by subjecting a hollow, straight tube having uniform diameter over the whole length thereof to cold working or swaging. The method for producing the drill shank may of course be adopted in any desired manner.

The material of the drill shank in this embodiment is not specifically limited. But, it is preferable to use a carbon steel tube as the material of the drill shank.

The angle of inclination of the taper portion 6 of the drill may be determined in the range of 1° to 8°, preferably 1° to 4°.

As described in detail above, the present invention provides an improved high-speed drill with excellent cutting property. Various modifications will become possible for those skilled in the art after receiving the teachings of the present disclosure without departing from the scope thereof.

What is claimed is:

1. A drill comprising a hollow drill shank having a fluid passage and a substantially cone shaped leading end, and a cutting bit provided at the leading end of said drill shank and having a through hole communicating with said fluid passage of the drill shank, said drill shank being provided on a rear end portion thereof with a fitting portion composed of a threaded portion and a taper portion which is adjacent to said threaded portion and has an outer diameter which gradually increases toward the leading end of said drill shank, and said cutting bit being composed of two halves of cutting portions which are divided by a slit and a substantially cone-shaped connecting portion joining said cutting portions and connecting said cutting bit to said drill.

2. A drill comprising a hollow drill shank having a fluid passage, and a cutting bit provided at a leading end of said drill shank and having a through hole communicating with said fluid passage of the drill shank and a blind cavity in said cutting bit, a diamond chip being provided on an innermost wall of said blind cavity, said drill shank being provided on a rear end portion thereof with a fitting portion composed of a threaded portion and a taper portion which is adjacent to said threaded portion and has an outer diameter which gradually increases toward the leading end of said drill shank, said cutting bit being composed of an outer grinding member made of relatively small abrasive grains and an inner grinding member made of relatively large abrasive grains, said outer and inner grinding members being coaxially arranged.

* * * * *